US012261307B2

(12) United States Patent
Cai et al.

(10) Patent No.: US 12,261,307 B2
(45) Date of Patent: Mar. 25, 2025

(54) END COVER ASSEMBLY, BATTERY CELL, BATTERY AND METHOD AND DEVICE FOR MANUFACTURING BATTERY CELL

(71) Applicant: CONTEMPORARY AMPEREX TECHNOLOGY (HONG KONG) LIMITED, Hong Kong (CN)

(72) Inventors: Qichang Cai, Ningde (CN); Huasheng Su, Ningde (CN); Xiaoping Zhang, Ningde (CN); Peng Wang, Ningde (CN); Quankun Li, Ningde (CN); Chengyou Xing, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 617 days.

(21) Appl. No.: 17/558,734

(22) Filed: Dec. 22, 2021

(65) Prior Publication Data

US 2022/0320642 A1  Oct. 6, 2022

Related U.S. Application Data

(63) Continuation of application No. PCT/CN2021/085426, filed on Apr. 2, 2021.

(51) Int. Cl.
*H01M 50/147* (2021.01)
*H01M 10/0525* (2010.01)
(Continued)

(52) U.S. Cl.
CPC ..... *H01M 50/147* (2021.01); *H01M 10/0525* (2013.01); *H01M 50/186* (2021.01); *H01M 50/627* (2021.01); *H01M 2220/20* (2013.01)

(58) Field of Classification Search
CPC .. H01M 50/147; H01M 50/60; H01M 50/609; H01M 50/627
See application file for complete search history.

(56) References Cited

U.S. PATENT DOCUMENTS

| 11,121,440 B2 | 9/2021 | Takabayashi et al. |
| 2019/0237742 A1 | 8/2019 | Takabayashi et al. |
| 2022/0294093 A1* | 9/2022 | Cai ..................... H01M 50/148 |

FOREIGN PATENT DOCUMENTS

| CN | 207938663 U | 10/2018 |
| CN | 208478390 U | 2/2019 |

(Continued)

OTHER PUBLICATIONS

Office Action dated Nov. 20, 2023 received in Japanese Application No. 2022-563184.

*Primary Examiner* — Amanda C. Walke
(74) *Attorney, Agent, or Firm* — Scullly, Scott, Murphy & Presser, P.C.

(57) ABSTRACT

Embodiments of the application provide an end cover assembly, a battery cell, a battery and a method and device for manufacturing the battery cell. The end cover assembly includes an end cover, an insulating part, a blocking part and a separating part. The end cover is provided with an injection hole. The insulating part is configured to be arranged on a side of the end cover in the thickness direction and is provided with a through hole. The blocking part is provided with a liquid outlet and is configured to change a flow direction of a fluid medium passing through the injection hole and the through hole, and the fluid medium after changing the flow direction entering inside of the battery cell through the liquid outlet. The separating part is configured to separate a tab from the end cover.

18 Claims, 8 Drawing Sheets

(51) Int. Cl.
*H01M 50/186* (2021.01)
*H01M 50/627* (2021.01)

(56) References Cited

FOREIGN PATENT DOCUMENTS

| | | | | |
|---|---|---|---|---|
| CN | 110085777 | A | | 8/2019 |
| CN | 210778796 | U | | 6/2020 |
| CN | 112421155 | A | | 2/2021 |
| CN | 116979196 | A | * | 10/2023 |
| CN | 117060021 | A | * | 11/2023 |
| JP | 2013257951 | A | | 12/2013 |
| JP | 2016207353 | A | | 12/2016 |
| JP | 2018198163 | A | | 12/2018 |
| JP | 2019129129 | A | | 8/2019 |
| KR | 20150017624 | A | * | 2/2015 |
| WO | 2021024629 | A1 | | 2/2021 |

* cited by examiner

END COVER ASSEMBLY, BATTERY CELL, BATTERY AND METHOD AND DEVICE FOR MANUFACTURING BATTERY CELL

CROSS-REFERENCE TO RELATED APPLICATIONS

This application is a continuation of International Application No. PCT/CN2021/085426, filed on Apr. 2, 2021, the disclosure of which is hereby incorporated by reference in its entirety.

TECHNICAL FIELD

The application relates to the technical field of batteries, in particular to an end cover assembly, a battery cell, a battery and a method and device for manufacturing the battery cell.

BACKGROUND

At present, major batteries used in vehicles are usually lithium ion batteries, and as rechargeable batteries, the lithium ion batteries have the advantages of small size, high energy density, high power density, more recycling number of times, long storage time and the like.

The rechargeable battery cell usually includes a shell, an end cover assembly and an electrode assembly. The electrode assembly is located in the shell, and the end cover assembly covers the shell to provide a sealed environment for the electrode assembly.

A condition of short circuit between a positive electrode and a negative electrode appears easily in a using process of a common battery cell.

SUMMARY

Embodiments of the application provide an end cover assembly, a battery cell, a battery and a method and device for manufacturing the battery cell, and a risk of short circuit between a positive electrode and a negative electrode of the battery cell may be reduced effectively.

In a first aspect, embodiments of the application provide an end cover assembly for a battery cell, the battery cell including an electrode assembly provided with a tab, where the end cover assembly includes: an end cover provided with an injection hole, the injection hole penetrating through the end cover in a thickness direction of the end cover; an insulating part configured to be arranged on a side of the end cover in the thickness direction, the insulating part being provided with a through hole and the through hole penetrating through the insulating part in the thickness direction; a blocking part provided with a liquid outlet, the blocking part being configured to change a flow direction of a fluid medium passing through the injection hole and the through hole, and the fluid medium after changing the flow direction entering inside of the battery cell through the liquid outlet; and a separating part configured to separate the tab from the end cover so as to prevent the tab from penetrating through the through hole to be in contact with the end cover.

In the technical scheme, the blocking part plays a role of changing a flowing direction of the fluid medium (for example, an electrolyte). When the fluid medium is injected into the battery cell via the injection hole, the fluid medium passing through the injection hole in the end cover and the through hole in the insulating part changes direction under a resisting action of the blocking part and enters the inside of the battery cell from the liquid outlet of the blocking part, so that an impact force of the fluid medium on an isolating membrane of the electrode assembly in the battery cell is reduced, and a risk of short circuit caused by contact of a positive electrode piece and a negative electrode piece of the electrode assembly is reduced. In addition, the separating part plays a role of separating the tab from the end cover to prevent the tab from penetrating through the through hole in the insulating part to be in contact with the end cover, so that the risk of short circuit caused by contact of tab and the end cover is reduced.

In some embodiments, in the thickness direction, a projection of the separating part on the insulating part covers a part of the through hole.

In the technical scheme, a projection of the separating part on the insulating part covers a part of the through hole, and the separating part may play a role of resisting the fluid medium flowing through the injection hole and the through hole, so that an impact force of the fluid medium on the isolating membrane of the electrode assembly is reduced.

In some embodiments, in the thickness direction, a projection of the blocking part on the insulating part covers a part of the through hole.

In the technical scheme, the projection of the blocking part on the insulating part covers the part of the through hole, so that the blocking part plays a role of resisting the fluid medium flowing through the injection hole and the through hole well, so as to achieve a purpose of changing the flow direction of the fluid medium.

In some embodiments, in the thickness direction, the separating part is closer to the end cover than the liquid outlet.

In some embodiments, at least one side of the blocking part in a first direction is provided with the separating part, the first direction being perpendicular to the thickness direction.

In the technical scheme, at least one side of the blocking part in the first direction is provided with the separating part, so that the blocking part and the separating part are more compact in integral structure.

In some embodiments, two sides of the blocking part in the first direction are both provided with the separating part.

In the technical scheme, the two sides of the blocking part in the first direction are both provided with the separating part, and two separating parts on the blocking part may separate two tabs in the first direction from the end cover.

In some embodiments, in the first direction, at least one side of the blocking part is provided with the liquid outlet, and the tab is configured to be arranged on one side of the blocking part and face the liquid outlet.

In the technical scheme, at least one side of the blocking part in the first direction is provided with the liquid outlet, and after the tab is arranged on a side of the blocking part in the first direction and faces the liquid outlet, the separating part may separate the tab from the end cover.

In some embodiments, the first direction is consistent with a width direction of the end cover.

In some embodiments, along a direction of the separating part departing from the blocking part, a part of a wall of the through hole exceeds the separating part.

In the technical scheme, along a direction of the separating part departing from the blocking part, a part of a wall of the through hole exceeds the separating part, i.e., the separating part does not exceed the through hole completely along the direction departing from the blocking part, and the structure may reduce a space occupied by the separating part.

In some embodiments, along the direction of the separating part departing from the blocking part, the through hole is provided with an exceeding portion that exceeds the separating part; and the battery cell further includes a current collecting member, the current collecting number configured to connect the tab with an electrode terminal mounted on the end cover and a projection of the current collecting member in the thickness direction at least partially covering the exceeding portion.

In the technical scheme, the projection of the current collecting member in the thickness direction at least partially covers the exceeding portion of the through hole, and the structure may guarantee ensure sufficient connection area between the current collecting member and the tab.

In some embodiments, the blocking part includes a first side surface, and the separating part and the liquid outlet both are arranged on the first side surface.

In some embodiments, the separating part includes a second side surface opposite to the blocking part, and the second side surface is parallel to the first side surface.

In the technical scheme, the second side surface of the separating part is parallel to the first side surface of the blocking part, so that the space of other parts (for example, the current collecting member and the tab) occupied by the separating part may be reduced.

In some embodiments, the blocking part is configured to be connected to the insulating part.

In the technical scheme, the blocking part is connected to the insulating part, so that relative positions of the blocking part and the insulating part are kept fixed, which facilitates the blocking part to change the flow direction of the fluid medium flowing through the injection hole and the through hole.

In some embodiments, the blocking part includes a connecting portion and a resisting portion, the connecting portion is configured to connect the resisting portion with the insulating part, the resisting portion is arranged facing the through hole in the thickness direction, and the liquid outlet is arranged at the connecting portion.

In the technical scheme, the connecting portion plays a role of connecting the resisting portion with the insulating part. The resisting portion is arranged facing the through hole in the thickness direction, and the resisting portion plays a role of resisting the fluid medium well, so that the fluid medium changes the direction and enters the battery cell from the liquid outlet.

In some embodiments, the separating part is configured to be connected to the blocking part.

In the technical scheme, the separating part is connected to the blocking part, so that the separating part and the blocking part are better in integrality, and the blocking part and the separating part are more compact in integral structure.

In some embodiments, the blocking part, the separating part and the insulating part are of an integrally formed structure.

In the technical scheme, the blocking part, the separating part and the insulating part are of an integrally formed structure, so that a forming process may be simplified and fastness of the blocking part, the separating part and the insulating part is improved.

In some embodiments, the end cover is provided with a protruding portion at a position corresponding to the injection hole, and the protruding portion is at least partially accommodated in the through hole.

In the technical scheme, the end cover is provided with the protruding portion in the position corresponding to the injection hole, so that the strength of the position of the end cover provided with the injection hole may be increased. The protruding portion is at least partially accommodated in the through hole, and the structure enables the insulating part and the end cover to be more compact in integral structure so as to free up more space for the electrode assembly, so that it is beneficial to increase the capacity of battery cell.

In some embodiments, in the thickness direction, a projection of the protruding portion on the end cover is at least partially overlapped with a projection of the separating part on the end cover.

In some embodiments, the end cover assembly further includes a plugging part, the plugging part being inserted into the injection hole to plug the injection hole; and the blocking part is configured to restrict the plugging part from moving to the inside of the battery cell when the plugging part leans against the blocking part along the thickness direction.

In the technical scheme, the blocking part may play a role of resisting the plugging part, so that a risk that the blocking part falls into the inside of the battery cell is reduced.

In some embodiments, the blocking part includes a blocking surface facing the injection hole in the thickness direction; the end cover is provided with a first surface facing the blocking surface in the thickness direction; and a length of the plugging part in the thickness direction is greater than a distance between the first surface and the blocking surface.

In the technical scheme, the length of the plugging part in the thickness direction is greater than the distance between the first surface and the blocking surface, so that a risk that the plugging part fails to plug the injection hole as the blocking part is separated from the injection hole to enter a gap between the first surface and the blocking surface is reduced.

In some embodiments, the battery cell further includes a current collecting member, the current collecting member is configured to connect the tab with an electrode terminal mounted on the end cover, the current collecting member includes a connecting surface opposite to the end cover, and the connecting surface is configured to be connected to the tab; and in the thickness direction, the connecting surface is located farther away from the end cover compared with the separating part.

In the technical scheme, the connecting surface of the current collecting member is located farther away from the end cover compared with the separating part in the thickness direction, and the structure may increase the distance between the tab and the end cover, so that the risk that the tab is in contact with the end cover is further reduced.

In a second aspect, embodiments of the application provide a battery cell, including: a shell provided with an opening; an electrode assembly accommodated in the shell, the electrode assembly including a tab; and the end cover assembly provided by any one of embodiments in the first aspect, the end cover being configured to cover the opening.

In a third aspect, the embodiments of the application provide a battery, including: a box body; and the battery cell provided by any one of embodiments in the second aspect, the battery cell being accommodated in the box body.

In a fourth aspect, the embodiments of the application provide an electric device, including the battery cell provided by any one of embodiments in the second aspect.

In a fifth aspect, the embodiments of the application provide a method for manufacturing a battery cell, including: providing a shell provided with an opening; providing an electrode assembly, the electrode assembly including a tab; providing an end cover assembly; accommodating the electrode assembly in the shell; and covering the opening with the end cover assembly, where the end cover assembly includes an end cover provided with an injection hole, the injection hole penetrating through the end cover in a thickness direction of the end cover; an insulating part configured to be arranged on a side of the end cover in the thickness direction, the insulating part being provided with a through hole and the through hole penetrating through the insulating part in the thickness direction; a blocking part provided with a liquid outlet, the blocking part being configured to change a flow direction of a fluid medium passing through the injection hole and the through hole, and the fluid medium after changing the flow direction entering inside of the battery cell through the liquid outlet; and a separating part configured to separate the tab from the end cover so as to prevent the tab from penetrating through the through hole to be in contact with the end cover.

In a sixth aspect, the embodiments of the application further provide a device for manufacturing a battery cell, including: a first provision apparatus configured to provide a shell provided with an opening; a second provision apparatus configured to provide an electrode assembly, the electrode assembly including a tab; a third provision apparatus configured to provide an end cover assembly; and an assembling apparatus configured to accommodate the electrode assembly in the shell and cover the opening with the end cover assembly, where the end cover assembly includes an end cover provided with an injection hole, the injection hole penetrating through the end cover in a thickness direction of the end cover; an insulating part configured to be arranged on a side of the end cover in the thickness direction, the insulating part being provided with a through hole and the through hole penetrating through the insulating part in the thickness direction; a blocking part provided with a liquid outlet, the blocking part being configured to change a flow direction of a fluid medium passing through the injection hole and the through hole, and the fluid medium after changing the flow direction entering inside of the battery cell through the liquid outlet; and a separating part configured to separate the tab from the end cover so as to prevent the tab from penetrating through the through hole to be in contact with the end cover.

BRIEF DESCRIPTION OF DRAWINGS

In order to describe the technical schemes in the embodiments of the application more clearly, brief introduction on drawings needed to be used in the embodiments will be made below. It is apparent that the drawings described below are merely some embodiments of the application, and those skilled in the technical field further can obtain other drawings according to the drawings without creative efforts.

Figure 1:
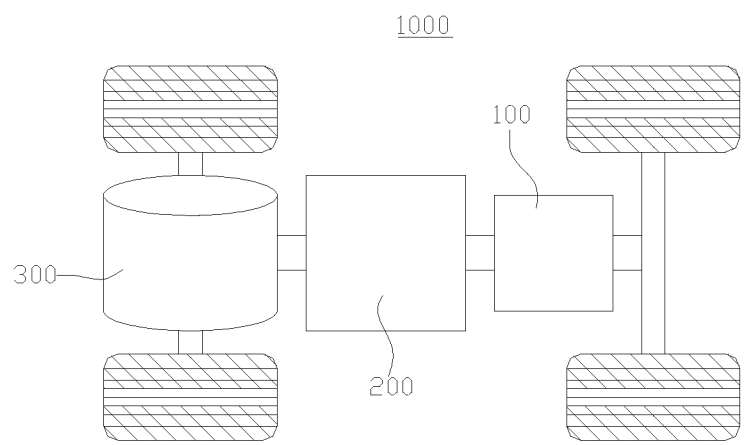
FIG. 1 is a structural schematic diagram of a vehicle provided by some embodiments of the application.

In the drawings, the drawings are not drawn in an actual proportion.

Description of labels: 10—box body; 11—first portion; 12—second portion; 13—accommodating space; 20—battery cell; 21—shell; 22—electrode assembly; 221—tab; 221a—positive electrode tab; 221b—negative electrode tab; 23—end cover assembly; 231—end cover; 2311—injection hole; 2312—protruding portion; 2312a—first end surface; 2313—first inner surface; 2314—first outer surface; 2315—first surface; 232—insulating part; 2321—through hole; 2322—second inner surface; 2323—second outer surface; 233—electrode terminal; 233a—positive electrode terminal; 233b—negative electrode terminal; 234—pressure relief mechanism; 235—blocking part; 2351—liquid outlet; 2352—connecting portion; 2353—resisting portion; 2353a—guiding bevel; 2354—first side surface; 2355—blocking surface; 236—separating part; 2361—second side surface; 237—ptabging part; 24—closed space; 25—current collecting member; 251—connecting surface; 252—avoidance notch; 30—battery module; 40—converging part; 100—battery; 200—controller; 300—motor; 1000—vehicle; 1100—first provision apparatus; 1200—second provision apparatus; 1300—third provision apparatus; 1400—assembling apparatus; 2000—manufacturing device; X—length direction; Y—first direction; Z—thickness direction.

DESCRIPTION OF EMBODIMENTS

In order to make purposes, technical schemes and advantages of the embodiments of the application clearer, description will be made on technical scheme in the embodiment of the application below in combination with drawings in the embodiment of the application. It is apparent that the described embodiments are a part of embodiments of the application and are not all the embodiments. On a basis of the embodiments in the disclosure, all other embodiments obtained by those skilled in the technical field without creative efforts fall into the scope of protection of the disclosure.

Unless otherwise defined, all technical and scientific terms used in the application are the same with meaning usually understood by those skilled in the art of the application. Terms used in the description of the application are merely to describe specific embodiments rather than limit the application. Terms "include" and "have" and any deformation thereof in the description, claims and drawings of the application are intended to cover non-exclusive inclusion.

Terms "first", "second" and the like in the description, claims or drawings of the application are used for distinguishing similar objects rather than describing a specific sequence or primary and secondary relation.

The "embodiments" in the application mean that specific features, structure or characteristics described in combination with the embodiments may be included in at least one embodiment of the application. The phrase emerges in each position of the description is not necessary the same embodiment or independent or alternative embodiments mutually exclusive to other embodiments.

In the description of the application, it is to be noted that unless otherwise specified and defined, terms 'mounting', 'connecting', 'connection' and 'attaching' should be understood in a broad sense, for example, 'mounting', 'connecting', 'connection' and 'attaching' can be either fixed connection or detachable connection or integrated connection; can be either direct connection and can be either indirect connection via an intermediation or internal communication of two components. Those skilled in the art can understand specific meaning of the terms in the disclosure under specific circumstances.

In the embodiments of the application, same drawing labels represent same components. In order for briefness, in different embodiments, detailed description on same components is omitted. It is to be understood that dimensions such as thickness, length and width of various components and dimensions such integral thickness, length and width of the integrating apparatus in the embodiments of the application in the drawings are exemplary description and do not define the application.

"A plurality of" in the application refers to more than two (including two).

In the application, the battery cell may include a lithium ion secondary battery, a lithium ion primary battery, a lithium-sulfur battery, a sodium lithium ion battery, a sodium ion battery or a magnesium ion battery and the like, which is not defined in the embodiments of the application. The battery cell may be cylindrical, flat, cuboid or in other shapes and the like, which is not defined in the embodiments of the application. The battery cell is divided into three types according to encapsulating ways: a cylindrical battery cell, a square battery cell and a soft roll battery cell, which is not defined in the embodiments of the application.

The battery provided in the embodiments of the application refers to a physical module including one or more battery cells to provide higher voltage and capacity. For example, the battery provided in the application may include a battery module or a battery pack and the like. The battery usually includes a box body for encapsulating one or more battery cells. The box body may prevent a liquid or other foreign matters from affecting charging or discharging of the battery cell.

The battery cell includes an electrode assembly and an electrolyte, and the electrode assembly is composed of a positive electrode piece, a negative electrode piece and an isolating membrane. The battery cell works primarily dependent on movement of metal ions between the positive electrode piece and the negative electrode piece. The positive electrode piece includes a positive electrode current collector and a positive electrode active substance layer, the positive electrode active substance layer is coated to the surface of the positive electrode current collector, the positive electrode current collector not coated with the positive electrode active substance layer protrudes out of the positive electrode current collector of the positive electrode active substance layer, and the positive electrode current collector not coated with the positive electrode active substance layer is used as the positive electrode tab. By taking the lithium ion battery as an example, the positive electrode current collector is made from aluminum, and the positive electrode active substance may be lithium cobalt oxide, lithium iron phosphate, ternary lithium or lithium manganate and the like. The negative electrode piece includes a negative electrode current collector and a negative electrode active substance layer, the negative electrode active substance layer is coated to the surface of the negative electrode current collector, the negative electrode current collector not coated with the negative electrode active substance layer protrudes out of the negative electrode current collector of the negative electrode active substance layer, and the negative electrode current collector not coated with the negative electrode active substance layer is used as the negative electrode tab. The negative electrode current collector is made from copper, and the negative electrode active substance may be carbon or silicon and the like. In order to guarantee that a large current passes through without fusion, a plurality of negative electrode tabs are stacked together and a plurality of positive electrode tabs are stacked together. The isolating membrane may be PP (polypropylene) or PE (polyethylene) and the like. In addition, the electrode assembly may be either of a winding type structure or a stacked structure, which is not defined in the embodiments of the application.

For development of battery technology, design factors in multiple aspects are considered simultaneously, for example, performance parameters such as energy density, cycle life, discharge capacity and charge-discharge rate. In addition, the safety of the battery needs to be further considered.

The applicant finds that the battery cell is prone to short-circuit between the positive and negative electrodes during use. The applicant further finds by researches that in the process of injecting a fluid medium (such as electrolyte) into the battery cell through the injection hole on the end cap of the battery cell, in order to improve the injection efficiency, a relatively large injection pressure is needed. A fluid medium directly acts to the electrode assembly in the battery cell, and the fluid medium generates a relatively large impact force to the isolating membrane of the electrode assembly, so that the isolating membrane between the positive electrode piece and the negative electrode piece deforms and displaces to further lead to short circuit of the positive electrode and the negative electrode.

In view of this, the embodiments of the application provide an end cover assembly for a battery cell, the battery cell including an electrode assembly provided with a tab. The end cover assembly includes an end cover, an insulating part, a blocking part and a separating part. The end cover is provided with an injection hole, and the injection hole penetrates through the end cover in a thickness direction of the end cover. The insulating part is configured to be arranged on a side of the end cover in the thickness direction, the insulating part is provided with a through hole, and the through hole penetrates through the insulating part in the thickness direction. The blocking part is provided with a liquid outlet, and the blocking part is configured to change a flow direction of a fluid medium passing through the injection hole and the through hole, and the fluid medium after changing the flow direction entering inside of the battery cell through the liquid outlet. The separating part is configured to separate the tab from the end cover so as to prevent the tab from penetrating through the through hole to be in contact with the end cover. The impact force of the fluid medium on the isolating membrane of the electrode assembly in the battery cell is reduced via the blocking part, and the tab and the end cover are separated via the separating part, so that the risk of short circuit of the positive electrode and the negative electrode of the battery cell is reduced.

The technical scheme described in the above embodiments of the application is suitable for the battery cell, the battery and the electric device using the battery.

The electric device may be a vehicle, a mobile phone, a portable device, a notebook computer, a steamer, a spacecraft, an electric toy, an electric tool and the like. The vehicle may be a fuel automobile, a gas automobile or a new energy automobile. The new energy automobile may be a pure electric automobile, a hybrid automobile or an extended-range automobile and the like. The spacecraft may be an airplane, a rocket, a space shuttle, a spacecraft and the like. The electric toy includes a fixed electric toy or a movable electric toy, for example, a game machine, an electric automobile toy, an electric steamer toy, an electric airplane toy and the like. The electric tool includes a metal cutting electric tool, a grinding electric tool, an assembling electric tool and a railway electric tool, for example, an electric drill, an electric grinder, an electric wrench, an electric screw driver, an electric hammer, an electric impact drill, a concrete vibrator, an electric planer and the like. The electric device is not defined specifically in the embodiments of the application.

In order to facilitate description, the embodiments are described by taking the electric device which is the vehicle as an example.

In some embodiments, referring to FIG. 1, FIG. 1 is a structural schematic diagram of a vehicle 1000 provided by some embodiments of the application. The vehicle 1000 is internally provided with a battery 100, and the battery 100 may be arranged at the bottom, head or tail of the vehicle 1000. The battery 100 may be used for supplying power to the vehicle 1000, for example, the battery 100 may serve as an operating power supply of the vehicle 1000.

The vehicle 1000 may further include a controller 200 and a motor 300, and the controller 200 is configured to control the battery 100 to supply power to the motor 300, for example, for working electric demands of the vehicle 100 when starting, navigating and driving.

In some embodiments, the battery 100 may not only serve as the operating power supply of the vehicle 1000, but also may serve as a driving power supply of the vehicle 1000 to replace or partially replace fuel or natural gas to provide driving power to the vehicle 1000.

Figure 2:
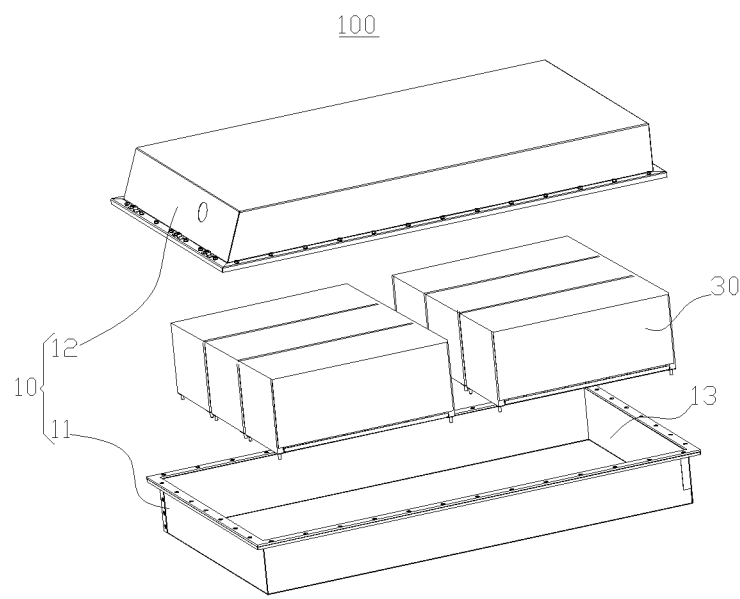
FIG. 2 is a structural schematic diagram of a battery provided by some embodiments of the application.

In some embodiments, referring to FIG. 2, FIG. 2 is a structural schematic diagram of the battery 100 provided by some embodiments of the application. The battery 100 includes a box body 10 and a battery cell 20 (not shown in FIG. 2), and the battery cell 20 is stored in the box body 10.

The box body 10 is configured to provide an accommodation space 13 for the battery cell 20. The box body 10 may be in various shapes, for example, cylinder, cuboid and the like. Certainly, the box body 10 may be of various structures.

In some embodiments, the box body 10 may include a first portion 11 and a second portion 12, and the first portion 11 and the second portion 12 cover each other to define the accommodation space 13 for accommodating the battery cell 20. Certainly, a connection between the first portion 11 and the second portion 12 may be sealed via a sealing member, and the sealing member may be a seal ring, a sealant and the like.

The first portion 11 and the second portion 12 may be of various shapes, for example, cuboid, cylinder and the like. The first portion 11 may be of a hollow structure opened in one side, the second portion 12 may be of a hollow structure opened in one side, too, and the opened side of the second portion 12 covers the opened side of the first portion 11 to form the box body 10 with the accommodation space 13. Certainly, the first portion 11 may be of a hollow structure opened in one side, the second portion 12 may be of a platy structure, and the second portion 12 covers the opened side of the first portion 11 to form the box body 10 with the accommodation space 13.

Figure 3:
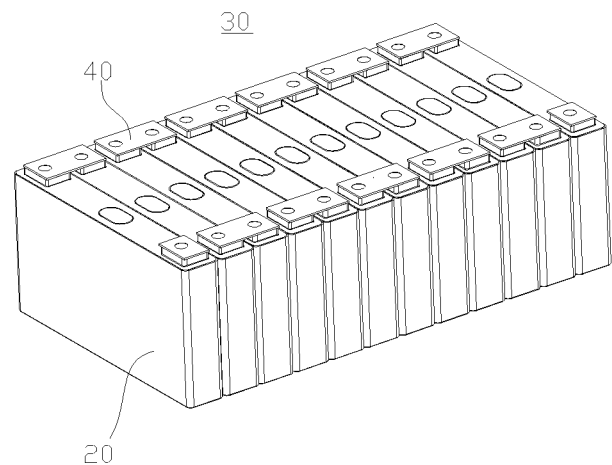
FIG. 3 is a structural schematic diagram of a battery module shown in FIG. 2.

The battery cell 20 may be cylindrical, flat, cuboid or in other shapes and the like. In the battery 100, there may be one or more battery cells 20. If there are a plurality of battery cells 20, the plurality of battery cells 20 are connected in series or in parallel or in parallel-series connection, and parallel-series connection refers to connection in series and in parallel of the plurality of battery cells 20. In some embodiments, the plurality of battery cells 20 may be directly connected in series or in parallel or in parallel-series connection together, and then the whole composed of the plurality of battery cells 20 is accommodated in the box body 10. In some other embodiments, referring to FIG. 3, FIG. 3 is a structural schematic diagram of the battery module 30 shown in FIG. 2. Further, the plurality of battery cells 20 are connected in series or in parallel or in parallel-series connection to form the battery module 30 firstly, and the plurality of battery modules 30 are then connected in series or in parallel or in parallel-series connection to form a whole which is accommodated in the box body 10 (shown in FIG. 2).

In some embodiments, the battery 100 may further includes a converging component 40, and the plurality of battery cells 20 may be electrically connected via the converging component 40 to realize serial connection or parallel connection or parallel-series connection of the plurality of battery cells 20.

Figure 4:
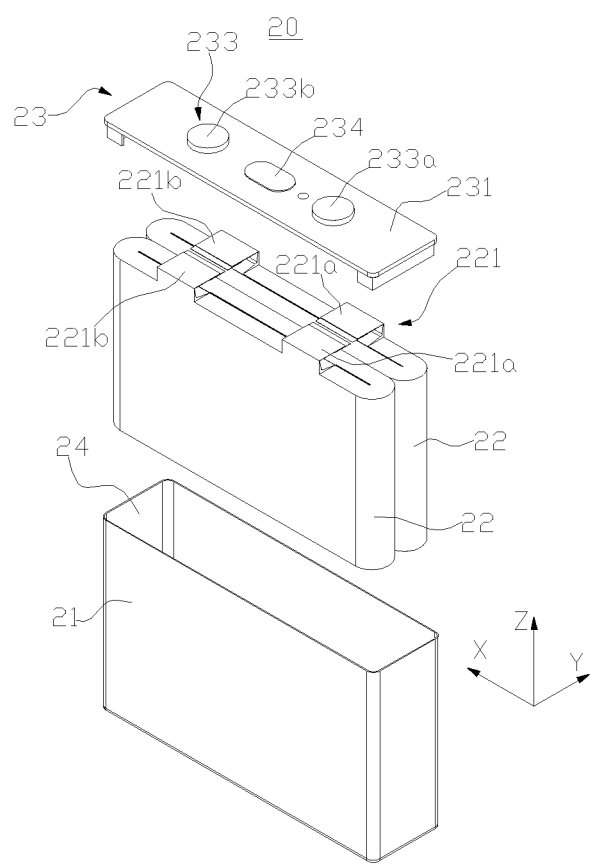
FIG. 4 is an exploded view of a battery cell provided by some embodiments of the application.

In some embodiments, referring to FIG. 4, FIG. 4 is an exploded view of a battery cell 20 provided by some embodiments of the application. The battery cell 20 may include a shell 21, an electrode assembly 22 and an end cover assembly 23. The shell 21 is provided with an opening, the electrode assembly 22 is accommodated in the shell 21 and the end cover assembly 23 is configured to cover the opening.

The shell 21 may be in various shapes, for example, cylinder, cuboid and the like. The shape of the shell 21 may be determined according to a specific shape of the electrode assembly 22. For example, if the electrode assembly 22 is of the cylindrical structure, the shell 21 may be of the cylindrical structure. If the electrode assembly 22 is of the cuboid structure, the shell 21 may be of the cuboid structure.

Exemplarily, in FIG. 4, the shell 21 is of a hollow cuboid structure opened in one end.

The shell 21 may be made from various materials, for example, copper, iron, aluminum, stainless, aluminum alloy and the like, which is not specifically defined in the embodiments of the application.

It should be noted that there may be one or more the electrode assemblies 22 in the shell 21. Exemplarily, the there are two electrode assemblies 22 in the shell 21, and the two electrode assemblies 22 are arranged in a stacked manner.

In some embodiments, the electrode assembly 22 includes a tab 221, and the tab 221 of the electrode assembly 22 is divided into a positive electrode tab 221a and a negative electrode tab 221b.

Under the condition that the battery cell 20 includes two electrode assemblies 22 that are arranged in a stacked manner, it may be that the positive electrode tab 221a of one electrode assembly 22 and the positive electrode tab 221a of the other electrode assembly 22 are arranged oppositely in a stacking direction of the two electrode assemblies 22, and the negative electrode tab 221b of the one electrode assembly 22 and the negative electrode tab 221b of the other electrode assembly 22 are arranged oppositely in a stacking direction of the two electrode assemblies 22.

In some embodiments, the electrode assembly 22 further includes a positive electrode piece, a negative electrode piece and an isolating membrane.

The electrode assembly 22 may be a rolled type structure formed by rolling the positive electrode piece, the isolating membrane and the negative electrode piece. The electrode assembly 22 may further be a stacked structure formed by stacking the positive electrode piece, the isolating membrane and the negative electrode piece.

The positive electrode piece includes a positive electrode current collector and positive electrode active substance layers coated on opposite two sides of the positive electrode current collector. The negative electrode piece includes a negative electrode current collector and negative electrode active substance layers coated on opposite two sides of the negative electrode current collector. In the positive electrode piece, a portion of the positive electrode current collector not coated with the positive electrode active substance layers may be taken as the positive electrode tab 221a, and in the negative electrode piece, a portion of the negative electrode current collector not coated with the negative electrode active substance layers may be taken as the negative electrode tab 221b.

The isolating membrane is provided with a lot of penetrating micropores to guarantee that electrolyte ions pass. The material of the isolating membrane may be PP (polypropylene) or PE (polyethylene) and the like.

In some embodiments, the end cover assembly 23 may include an end cover 231 and an electrode terminal 233. The end cover 231 is configured to cover the opening of the shell to form a closed space 24 for accommodating the electrode assembly 22. The electrode terminal 233 is mounted on the end cover 231, the electrode terminal 233 is configured to eclectically connect with the tab 221, and the electrode terminal 233 is configured to output electric energy of the battery cell 20.

Where, the closed space 24 is further configured to accommodate the fluid medium, such as electrolyte.

The electrode terminal 233 may be divided into a positive electrode terminal 233a and a negative electrode terminal 233b, the positive electrode terminal 233a is configured to be electrically connected with the positive electrode tab 221a and the negative electrode terminal 233b is configured to be electrically connected with the negative electrode tab 221b.

Exemplarily, the positive electrode terminal 233a and the negative electrode terminal 233b are distributed at an interval in a length direction X of the end cover 231.

In some embodiments, the end cover assembly 23 further may include a pressure relief mechanism 234, and the pressure relief mechanism 234 is mounted on the end cover 231. The pressure relief mechanism 234 is configured to relieve a pressure inside the battery cell 20 when an internal pressure or temperature of the battery cell 20 reaches a threshold value.

Exemplarily, in the length direction X of the end cover 231, the pressure relief mechanism 234 is located between the positive electrode terminal 233a and the negative electrode terminal 233b. The pressure relief mechanism 234 may be components such as an explosion-proof valve, an explosion-proof sheet, a gas valve, a pressure relief valve or a safety valve.

Figure 5:
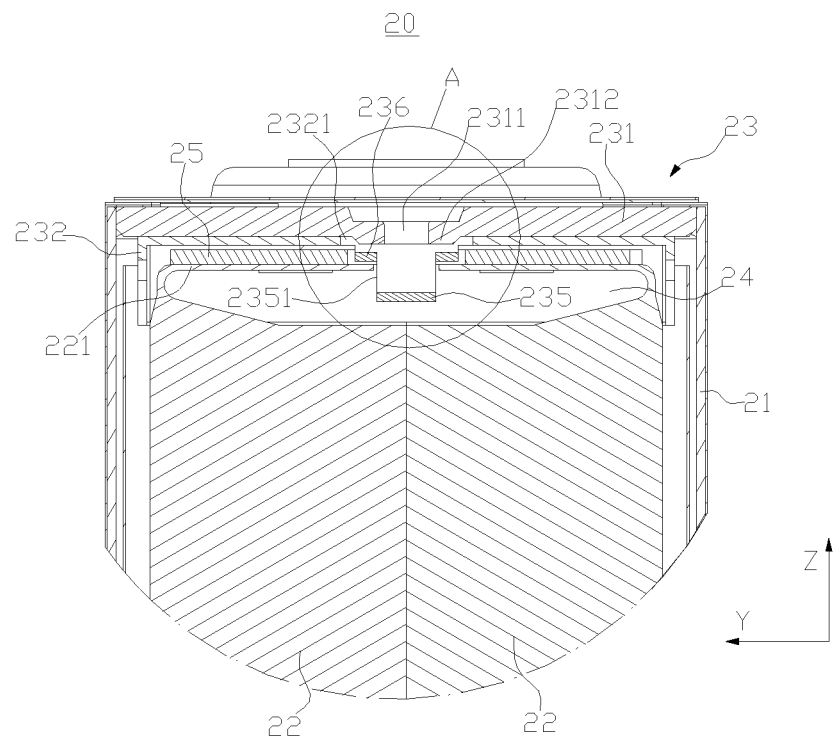
FIG. 5 is a local section view of a battery cell provided by some embodiments of the application.

In some embodiments, referring to FIG. 5, FIG. 5 is a partial section view of the battery cell 20 provided by some embodiments of the application. The end cover assembly 23 may include the end cover 231 and the insulating part 232. The insulating part 232 is configured to be arranged on a side of the end cover 231 facing the electrode assembly 22 in the thickness direction Z to separate the end cover 231 from the electrode assembly 22.

Where the end cover 231 is provided with an injection hole 2311, and the injection hole 2311 penetrates through the end cover 231 in the thickness direction Z of the end cover 231. The fluid medium may be injected into the inside (the closed space 24) of the battery cell 20 via the injection hole 2311.

The insulating part 232 is provided with the through hole 2321, and the through hole 2321 penetrates through the insulating part 232 in the thickness direction Z of the end cover 231. When the fluid medium is injected into the inside of the battery cell 20 via the injection hole 2311, the fluid medium flows through the through hole 2321.

The insulating part 232 is an insulating material, and may be made from materials such as rubber and a plastic. The plastic may be PBT (polybutylene terephthalate), PET (polyethylene terephthalate), PA (polyamide) and the like.

In some embodiments, the end cover assembly 23 further may include the blocking part 235, the blocking part 235 is provided with the liquid outlet 2351, and the blocking part 235 is configured to change the flow direction of the fluid medium passing through the injection hole 2311 and the through hole 2321, and the fluid medium after changing the flow direction entering the inside of the battery cell 20 through the liquid outlet 2351.

The blocking part 235 plays a role of changing the flowing direction of the fluid medium. When the fluid medium is injected into the battery cell 20 via the injection hole 2311, after the fluid medium passing through the injection hole 2311 in the end cover 231 and the through hole 2321 in the insulating part 232, the direction of the fluid medium changes under a resisting action of the blocking part 235 and the fluid medium enters the inside of the battery cell 20 from the liquid outlet 2351 of the blocking part 235, so that an impact force of the fluid medium on the isolating membrane of the electrode assembly 22 in the battery cell 20 is reduced, and a risk of short circuit caused by contact of the positive electrode piece and the negative electrode piece of the electrode assembly 22 is reduced.

In some embodiments, the separating part 23 may further include the separating part 236, and the separating part 236 is configured to separate the tab 221 from the end cover 231 so as to prevent the tab 221 from penetrating through the through hole 2321 to be in contact with the end cover 231.

The separating part 236 plays a role of separating the tab 221 from the end cover 231 to prevent the tab 221 from penetrating through the through hole 2321 in the insulating part 232 to be in contact with the end cover 231, so that the risk of short circuit caused by contact of tab 221 and the end cover 231 is reduced.

Where, in the thickness direction Z of the end cover 231, at least a part of the separating part 236 is located between the end cover 231 and the tab 221 to play a role of separating the tab 221 from the end cover 231.

It should be noted that the separating part 236 may play a role of separating the positive electrode tab 221a (shown in FIG. 4) from the end cover 231 or play a role of separating the negative electrode tab 221*b* (shown in FIG. 4) from the end cover 231. Certainly, the separating part 236 may further play a role of separating the positive electrode tab 221*a* from the end cover 231 and play a role of separating the negative electrode tab 221*b* from the end cover 231.

In some embodiments, the separating part 236 is closer to the end cover 231 than the liquid outlet 2351, so that the fluid medium enters the inside of the battery cell 20 through the liquid outlet 2351 after the separating part 236 separates the tab 221 from the end cover 231.

In some embodiments, the end cover 231 is provided with the protruding portion 2312 in the position corresponding to the injection hole 2311, so that the strength of the position of the end cover 231 provided with the injection hole 2311 is increased.

Where the protruding portion 2312 is at least partially accommodated in the through hole 2321. The structure enables the insulating part 232 and the end cover 231 to be more compact in integral structure so as to free up more space for the electrode assembly 22, so that it is beneficial to increase the capacity of battery cell 20.

Exemplarily, the injection hole 2311 and the through hole 2321 are coaxially arranged, and a bore diameter of the through hole 2321 is greater than a bore diameter of the injection hole 2311.

Figure 6:
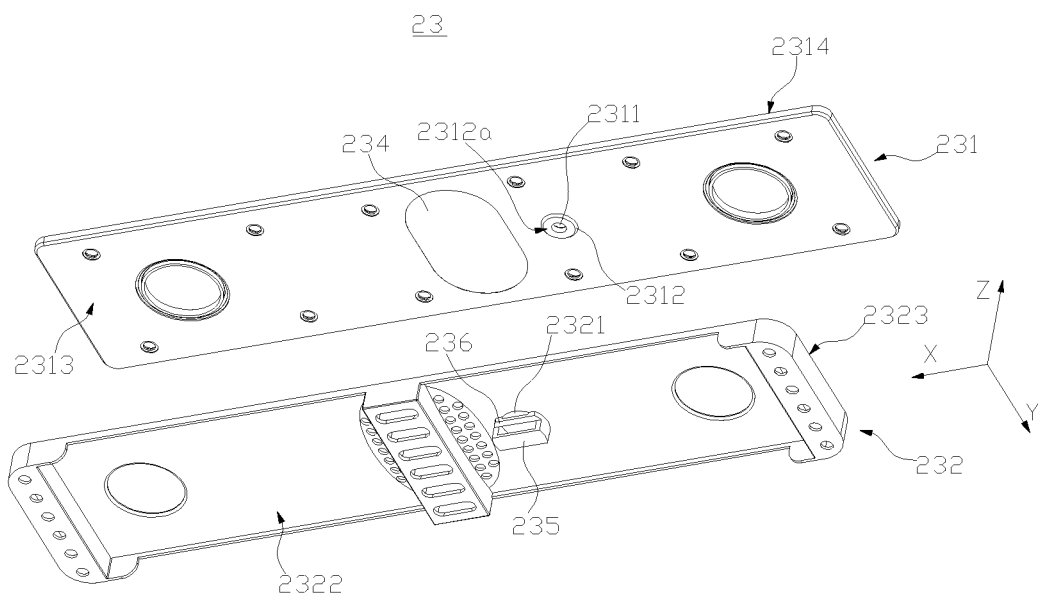
FIG. 6 is a partial exploded view of an end cover assembly shown in FIG. 5.

Referring to FIG. 6, FIG. 6 is a partial exploded view of the end cover assembly 23 shown in FIG. 5. The end cover 231 is provided with the first inner surface 2313 and the first outer surface 2314 oppositely arranged in the thickness direction Z thereof, the protruding portion 2312 is arranged on the first inner surface 2313 in a protruding manner, the protruding portion 2312 is provided with the first end surface 2312*a* opposite to the first outer surface 2314, and two ends of the injection hole 2311 penetrate through the first end surface 2312*a* and the first outer surface 2314 respectively.

The insulating part 232 is provided with the second inner surface 2322 and the second outer surface 2323 oppositely arranged in the thickness direction Z of the end cover 231, and two ends of the through hole 2321 penetrate through the second inner surface 2322 and the second outer surface 2323 respectively.

It should be noted that the second outer surface 2323 of the insulating part 232 may be attached to the first inner surface 2313 of the end cover 231, and there may be a distance between the second outer surface 2323 of the insulating part 232 and the first inner surface 2313 of the end cover 231. If the second outer surface 2323 of the insulating part 232 is attached to the first inner surface 2313 of the end cover 231 and a dimension of the protruding portion 2312 in the thickness direction Z of the end cover 231 is smaller than a dimension of the through hole 2321 in the thickness direction Z of the end cover 231, the protruding portion 2312 can be fully accommodated in the through hole 2321. If there is a distance between the second outer surface 2323 of the insulating part 232 and the first inner surface 2313 of the end cover 231, the protruding portion 2312 can be partially accommodated in the through hole 2321.

Figure 7:
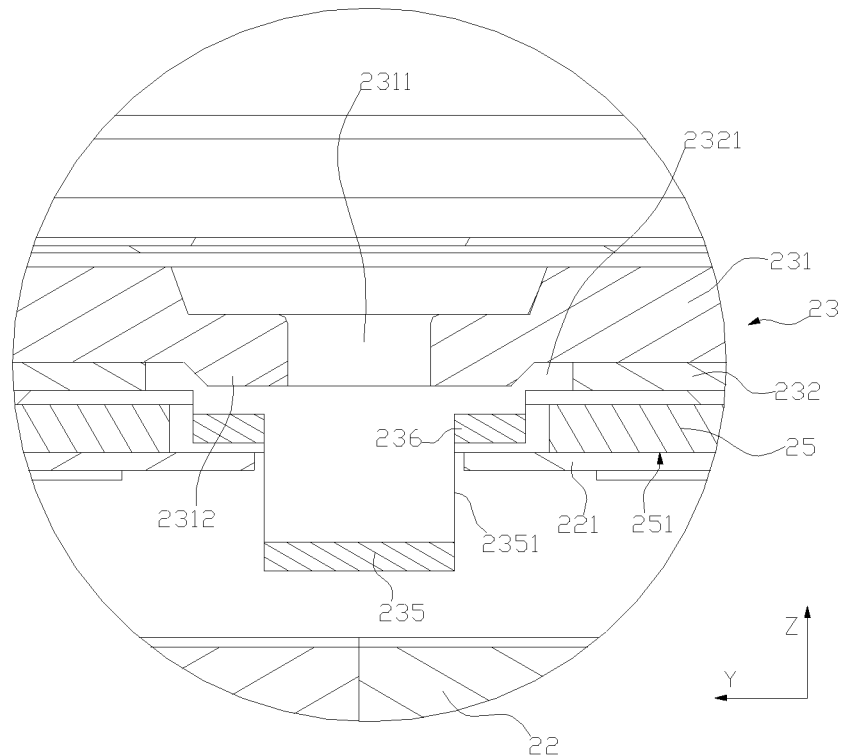
FIG. 7 is a partial enlarged drawing of A of the battery cell shown in FIG. 5.

In some embodiments, referring to FIG. 7, FIG. 7 is the partial enlarged view of A of the battery cell 20 shown in FIG. 5. In the thickness direction Z of the end cover 231, a projection of the protruding portion 2312 on the end cover 231 is at least partially overlapped with the projection of the separating part 236 on the end cover 231. That is, in the thickness direction Z of the end cover 231, the projection of the protruding portion 2312 on the end cover 231 has an overlap with the projection of the separating part 236 on the end cover 231, so that the separating part 236 plays a good role of separating the tab 221 from the protruding portion 2312.

Exemplarily, in the thickness direction Z of the end cover 231, the projection of the protruding portion 2312 on the end cover 231, the projection of the separating part 236 on the end cover 231 and the projection of the tab 221 on the end cover 231 are at least partially overlapped.

In some embodiments, the battery cell 20 may further include the current collecting member 25, and the current collecting member 25 is configured to connect the tab 221 with the electrode terminal 233 to realize electrical connection between the electrode terminal 233 and the tab 221. It should be understood that the positive electrode terminal 233*a* (shown in FIG. 4) and the positive electrode tab 221*a* (shown in FIG. 4) may be electrically connected via a current collecting member 25, and the negative electrode terminal 233*b* (shown in FIG. 4) and the negative electrode tab 221*b* (shown in FIG. 4) may be electrically connected via another current collecting member 25.

Exemplarily, the current collecting member 25 may be a metal conductor, for example, copper, iron, aluminum, stainless steel, an aluminum alloy and the like. The current collecting member 25 may be welded to the electrode terminal 233 and the tab 221 may further be welded to the current collecting member 25.

In some embodiments, the current collecting member 25 may include the connecting surface 251 opposite to the end cover 231, and the connecting surface 251 is configured to be connected with the tab 221. in the thickness direction Z of the end cover 231, the connecting surface 251 is located farther away from the end cover 231 compared with the separating part 236. The structure may increase the distance between the tab 221 and the end cover 231, so that the risk that the tab 221 is in contact with the end cover 231 is further reduced.

In the embodiment, in the thickness direction Z of the end cover 231, the tab 221 and the current collecting member 25 are arranged in a stacked manner, and the current collecting member 25 is closer to the insulating part 232 compared with the tab 221.

Exemplarily, the tab 221 may be welded to the connecting surface 251 of the current collecting member 25.

Figure 8:
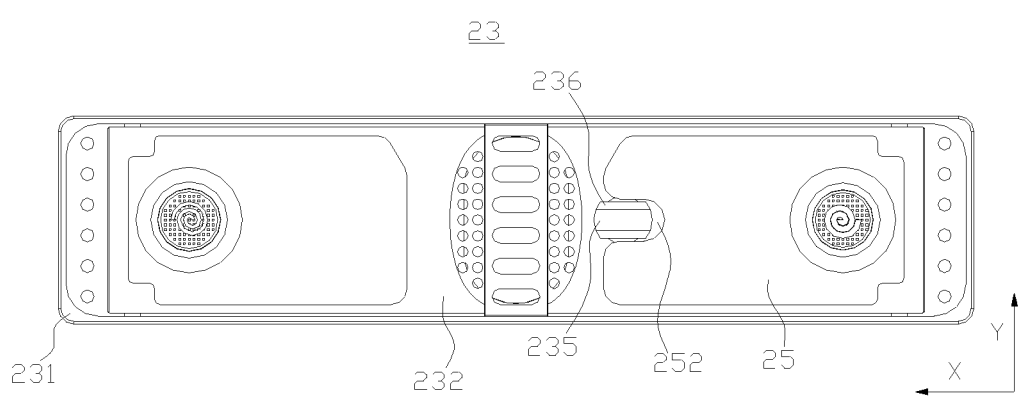
FIG. 8 is an upward view of the end cover assembly shown in FIG. 5.

In some embodiments, referring to FIG. 8, FIG. 8 is an upward view of the end cover assembly 23 shown in FIG. 5, and the current collecting member 25 is provided with an avoidance notch 252 that avoids the blocking part 235 and the separating part 236.

Figure 9:
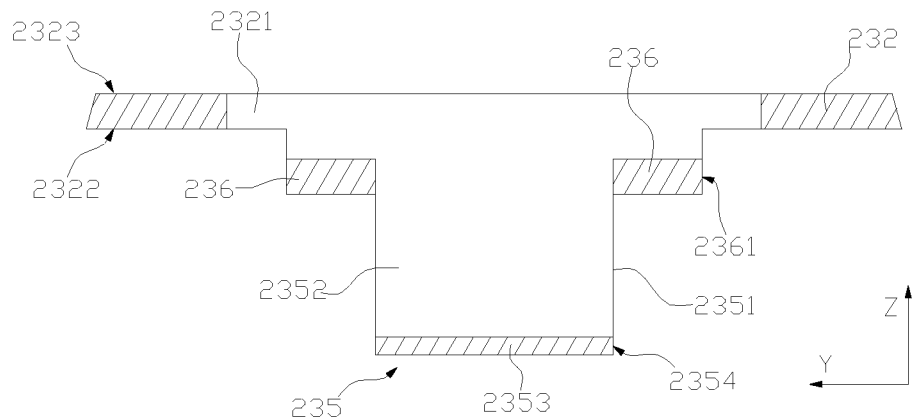
FIG. 9 is a local section view of an insulating part shown in FIG. 5.
Figure 10:
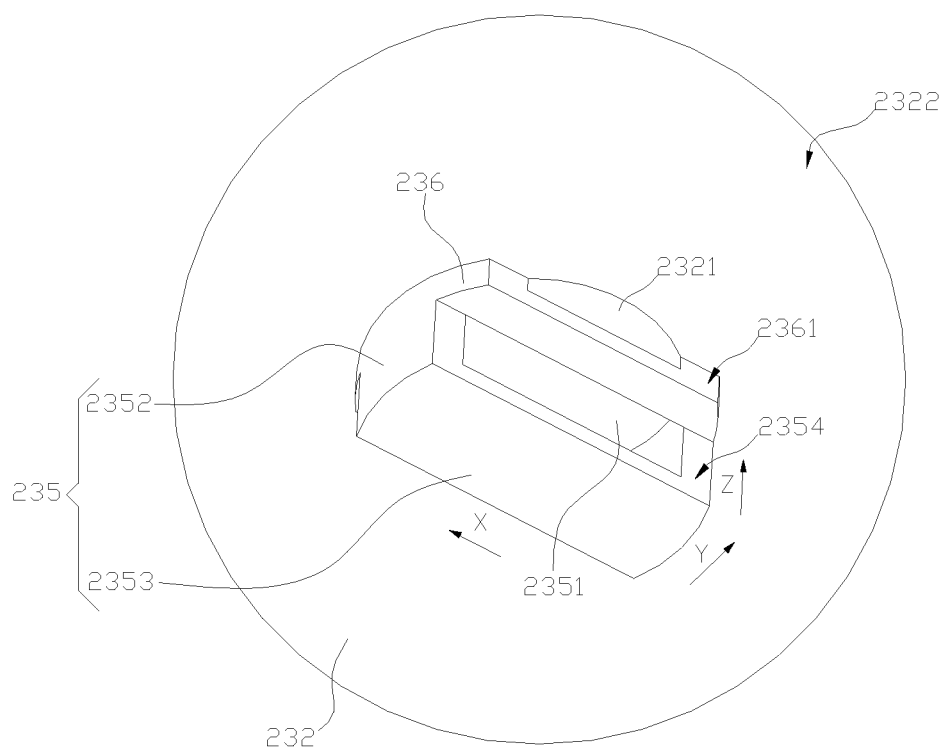
FIG. 10 is a connecting schematic diagram of the insulating part, the blocking part and the separating part shown in FIG. 5.

In some embodiments, referring to FIG. 9 and FIG. 10, FIG. 9 is a local section view of the insulating part 232 shown in FIG. 5, and FIG. 10 is a schematic diagram of connection of the insulating part 232, the blocking part 235 and the separating part 236 shown in FIG. 5. In the thickness direction Z of the end cover 231, the projection of the blocking part 235 on the insulating part 232 covers a part of the through hole 2321. According to the structure, the blocking part 235 plays a role of resisting the fluid medium flowing through the injection hole 2311 and the through hole 2321 well so as to achieve a purpose of changing the flow direction of the fluid medium.

In some embodiments, the blocking part 235 is configured to be connected to the insulating part 232, so that relative positions of the blocking part 235 and the insulating part 232 are kept fixed, which facilitates the blocking part 235 to change the flow direction of the fluid medium flowing through the injection hole 2311 and the through hole 2321.

The blocking part 235 and the insulating part 232 may be fixedly connected, for example, they are bonded, are in hot melting connection, are integrally formed and the like. The blocking part 235 and the insulating part 232 may be connected detachably, for example, they are in snap-fit, screw joint and the like.

Exemplarily, the blocking part 235 is directly fixed to the second inner surface 2322 of the insulating part 232.

In some embodiments, the blocking part 235 includes the connecting portion 2352 and the resisting portion 2353, the connecting portion 2352 is configured to connect the resisting portion 2353 to the insulating part 232, the resisting portion 2353 is arranged facing the through hole 2321 in the thickness direction Z of the end cover 231, and the liquid outlet 2351 is arranged at the connecting portion 2352.

The connecting portion 2352 plays a role of connecting the resisting portion 2353 with the insulating part 232. As the resisting portion 2353 is arranged facing the through hole 2321 in the thickness direction Z of the end cover 231, the resisting portion 2353 plays a role of resisting the fluid medium well, so that the fluid medium changes the direction and enters into the battery cell 20 from the liquid outlet 2351.

Exemplarily, the connecting portion 2352 may be of a hollow structure opened in two ends in the thickness direction Z of the end cover 231, and the connecting portion 2352 is internally provided with a runner communicating the through hole 2321 and the liquid outlet 2351. One end of the connecting portion 2352 in the thickness direction Z of the end cover 231 is connected to the second inner surface 2322 of the insulating part 232, and the resisting portion 2353 is plugged to the other end of the connecting portion 2352 in the thickness direction Z of the end cover 231.

Figure 11:
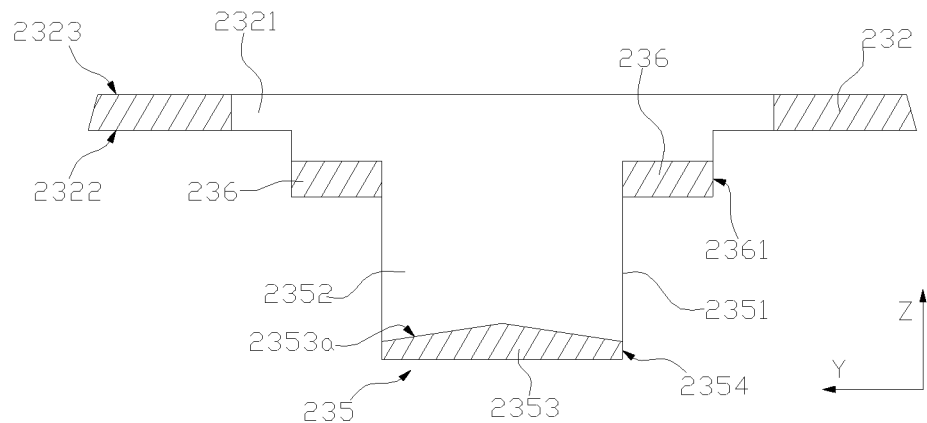
FIG. 11 is a local section view of an insulating part provided by some other embodiments of the application.

In some embodiments, referring to FIG. 11, FIG. 11 is the partial section view of the insulating part 232 provided by some other embodiments of the application. The inner surface of the resisting portion 2353 may be provided with the guiding bevel 2353a, the relatively low end of the guiding bevel 2353a is connected to the lower edge of the liquid outlet 2351, and the guiding bevel 2353a is configured to guide the fluid medium entering the connecting portion 2352 to the liquid outlet 2351 so as to reduce the risk that the fluid medium is left in the blocking part 235. The lower edge herein is an edge of a side of the liquid outlet 2351 away from the insulating part 232.

The guiding bevel 2353a may be either an inclined plane or a conical surface. The conical surface may be either a circular conical surface or a pyramidal surface. For example, the connecting portion 2352 is only provided with one liquid outlet 2351, and the guiding bevel 2353a may be the inclined plane with one end high and the other end low. For another example, a plurality of liquid outlets 2351 are arranged at an interval in the periphery of the connecting portion 2352, and the guiding bevel 2353a may be the conical surface with a high center and low surroundings.

Exemplarily, in FIG. 11, the connecting portion 2352 is provided with two oppositely arranged liquid outlets 2351, and the guiding bevel 2353a is the conical surface with a high center and low surroundings.

It should be noted that in other embodiments, the blocking part 235 may also be not connected to the end cover 231 but connected to other components in the battery cell 20, for example, the blocking part 235 is connected to the end cover 231.

In some embodiments, further referring to FIG. 9 and FIG. 10, in the thickness direction Z of the end cover 231, the projection of the separating part 236 on the insulating part 232 covers a part of the through hole 2321. The separating part 236 may play a role of resisting the fluid medium flowing through the injection hole 2311 and the through hole 2321, so that an impact force of the fluid medium on the isolating membrane of the electrode assembly 22 is reduced.

Exemplarily, in the thickness direction Z of the end cover 231, the projection of the separating part 236 on the insulating part 232 and the projection of the blocking part 235 on the insulating part 232 are staggered, that is, the projection of the separating part 236 on the insulating part 232 and the projection of the blocking part 235 on the insulating part 232 are not overlapped, so that the integral structure of the separating part 236 and the insulating part 232 may be simplified.

It should be noted that in the thickness direction Z of the end cover 231, if the projection of the separating part 236 on the insulating part 232 is just intersected with the projection of the blocking part 235 on the insulating part 232, which belongs to a condition that the projection of the separating part 236 on the insulating part 232 and the projection of the blocking part 235 on the insulating part 232 are staggered.

In some embodiments, the separating part 236 is configured to be connected to the blocking part 235, so that the separating part 236 and the blocking part 235 are better in integrality, and the blocking part 235 and the separating part 236 are more compact in integral structure.

It should be noted that the separating part 236 and the blocking part 235 may be fixedly connected, for example, they are bonded, are in hot melting connection, are integrally formed and the like. The separating part 236 and the blocking part 235 may be connected detachably, for example, they are in snap-fit, screw joint and the like.

Under the condition that the separating part 236 is connected to the blocking part 235, the separating part 236 and the insulating part 232 may be connected together, and there may be a certain distance between the separating part 236 and the insulating part 232.

Exemplarily, in FIG. 9 and FIG. 10, the separating part 236 is connected to the blocking part 235, and the separating part 236 is connected to the second inner surface 2322 of the insulating part 232.

In some embodiments, the blocking part 235, the separating part 236 and the insulating part 232 are of an integrally formed structure, that is, the blocking part 235, the separating part 236 and the insulating part 232 are integrally formed, so that the forming process of the three is simplified, and the fastness of the three is improved.

In other embodiments, the separating part 236 may be only connected with the insulating part 232 but not connected with the blocking part 235. The separating part 236 may be neither connected with the insulating part 232 nor the blocking part 235. The separating part 236 may be on other components of the battery cell 20, for example, the separating part 236 is connected to the shell 21 via a middleware, so that the separating part 236 is fixed to a position where the tab 221 and the end cover 231 may be separated.

In some embodiments, at least one side of the blocking part 235 in a first direction Y is provided with the separating part 236, the first direction Y being perpendicular to the thickness direction Z. That is, one side of the blocking part 235 in the first direction Y is provided with the separating part 236 or two sides of the blocking part 235 in the first direction Y are provided with the separating parts 236.

It should be noted that in the embodiment, the first direction Y is not defined specifically, for example, the first direction Y may be either the length direction X of the end cover 231 or the width direction of the end cover 231.

Figure 12:
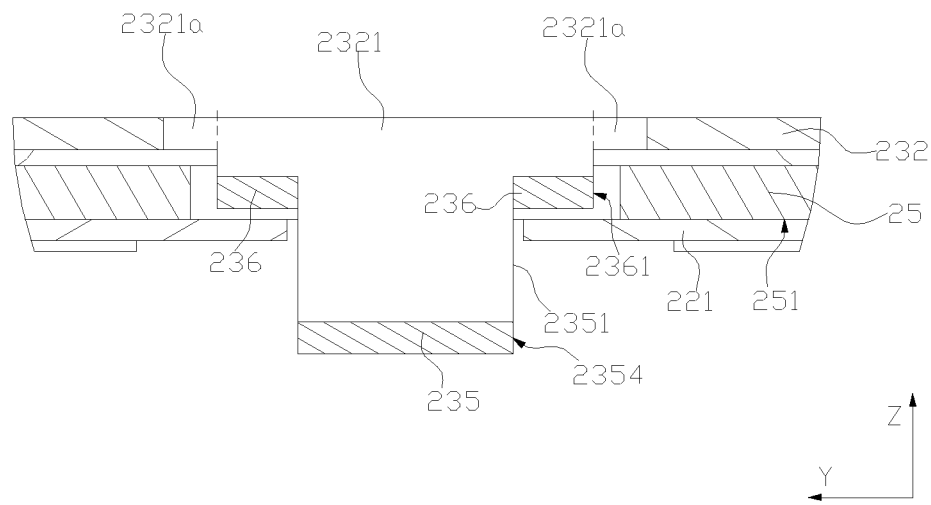
FIG. 12 is a position relationship diagram of an insulating part, a current collecting member and a tab shown in FIG. 5.

In some embodiments, referring to FIG. 12, FIG. 12 is a position relation diagram of the insulating part 232, the current collecting member 25 and the tab 221 shown in FIG. 5. In the first direction Y, at least one side of the blocking part 235 is provided with the liquid outlet 2351, and the tab 221 is configured to be arranged on one side of the blocking part 235 and face the liquid outlet 2351. That is, one side of the blocking part 235 in the first direction Y is provided with the liquid outlet 2351 or two sides of the blocking part 235 in the first direction Y are provided with the liquid outlets 2351.

As at least one side of the blocking part 235 in the first direction Y is provided with the liquid outlet 2351, and after the tab 221 is arranged on one side of the blocking part 235 in the first direction Y and faces the liquid outlet 2351, the separating part 236 can separate the tab 221 from the end cover 231.

Where the blocking part 235 may include a first side surface 2354, and the separating part 236 and the liquid outlet 2351 both are arranged on the first side surface 2354. The separating part 236 may include a second side surface 2361 opposite to the blocking part 235, and the second side surface 2361 is parallel to the first side surface 2354. The space of other parts (for example, the current collecting member 25 and the tab 221) occupied by the separating part 236 may be reduced according to the structure.

Where the first side surface 2354 and the second side surface 2361 both may be planes.

Exemplarily, the first direction Y is consistent with a width direction of the end cover 231.

In some embodiments, two sides of the blocking part 235 in the first direction Y are both provided with the separating parts 236.

As the two sides of the blocking part 235 in the first direction Y are both provided with the separating parts 236, the two separating parts 236 on the blocking part 235 may separate two tabs 221 in the first direction Y from the end cover 231.

The battery cell 20 including two electrode assemblies 22 (shown in FIG. 5) and the separating parts 236 configured to separate the end cover 231 (shown in FIG. 5) from the positive electrode tab 221a (shown in FIG. 5) of the electrode assembly 22 are taken as an example. The two electrode assemblies 22 are arranged in a stacked manner in the first direction Y, the positive electrode tab 221a of one electrode assembly 22 and the positive electrode tab 221a of the other electrode assembly 22 are arranged oppositely in the first direction Y, and the negative electrode tab 221b of one electrode assembly 22 and the negative electrode tab 221b of the other electrode assembly 22 are arranged oppositely in the first direction Y. The separating part 236 located on one side of the blocking part 235 in the first direction Y may be configured to separate the end cover 231 from the positive electrode tab 221a of one electrode assembly 22, and the separating part 236 located on the other side of the blocking part 235 in the first direction Y may be configured to separate the end cover 231 from the positive electrode tab 221a of the other electrode assembly 22.

In the embodiment, the blocking part 235 may be provided with two first side surfaces 2354 arranged oppositely in the first direction Y, and the two first side surfaces 2354 may both be provided with the liquid outlets 2351.

Exemplarily, the first direction Y is consistent with the width direction of the end cover 231, and the distance between the two first side surfaces 2354 in the first direction Y is smaller than a dimension of the blocking part 235 in the length direction X (shown in FIG. 11) of the end cover 231, so that the liquid outlet 2351 larger in dimension is opened in the first side surface 2354.

In some embodiments, further referring to FIG. 12, in the first direction Y, along a direction of the separating part 236 departing from the blocking part 235, a part of a wall of the through hole 2321 exceeds the separating part 236. That is, the separating part 236 does not exceed the through hole 2321 completely along the direction departing from the blocking part 235, and the structure can reduce a space occupied by the separating part 236, so that the risk that the current collecting member 25 and the separating part 236 intervene with each other may be reduced.

It should be understood that in the first direction Y, a part of a wall of the through hole 2321 exceeds the second side surface 2361 of the separating part 236 along a direction of the separating part 236 departing from the blocking part 235.

Exemplarily, along the direction of the separating part 236 departing from the blocking part, the through hole 2321 is provided with an exceeding portion 2321a that exceeds the separating part 236, and a projection of the current collecting member 25 in the thickness direction at least partially covers the exceeding portion 2321a. Such arrangement may guarantee an enough connecting area between the current collecting member 25 and the tab 221. For example, the current collecting member 25 is in welded connection to the tab 221, the projection of the current collecting member 25 in the thickness direction at least partially covers the exceeding portion 2321a, thereby guaranteeing an enough connecting area between the current collecting member 25 and the tab 221.

Figure 13:
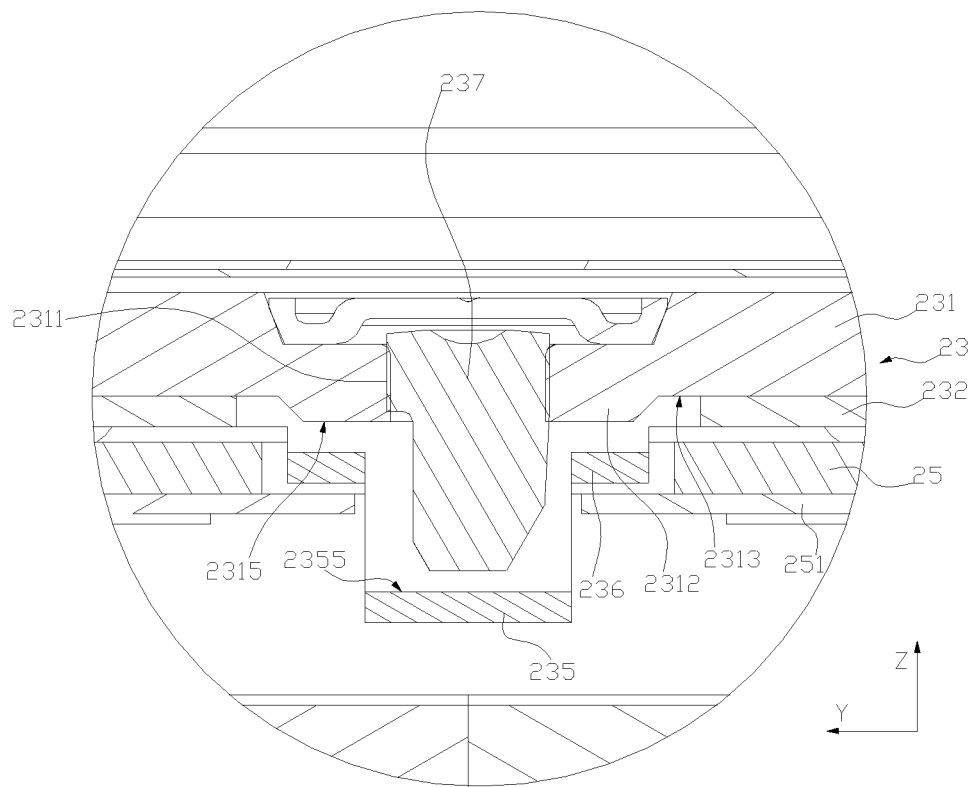
FIG. 13 is a partial enlarged drawing of a battery cell provided by another some embodiments of the application.

In some embodiments, referring to FIG. 13, FIG. 13 is a partial enlarged drawing of the battery cell 20 provided by some embodiments of the application. The end cover assembly 23 may further include the insulating part 237. The insulating part 237 is configured to be inserted into the injection hole 2311 of the end cover 231 so as to plug the injection hole 2311. The blocking part 235 is configured to restrict the plugging part 237 from moving to the inside of the battery cell 20 when the plugging part 237 leans against the blocking part 235 along the thickness direction Z of the end cover 231.

The blocking part 235 may play a role of resisting the plugging part 237, so that a risk that the blocking part 235 falls into the inside of the battery cell 20 is reduced.

Exemplarily, the plugging part 237 may be a sealing nail made from materials such as rubber and plastic.

In some embodiments, the blocking part 235 includes a blocking surface 2355 facing the injection hole 2311 in the thickness direction Z of the end cover 231. The end cover 231 is provided with a first surface 2315 facing the blocking surface 2355 in the thickness direction Z of the end cover 231. A length of the plugging part 237 in the thickness direction Z of the end cover 231 is greater than a distance between the first surface 2315 and the blocking surface 2355. The structure reduces a risk that the plugging part 237 fails to plug the injection hole 2311 as the blocking part 235 is separated from the injection hole 2311 to enter a gap between the first surface 2315 and the blocking surface 2355.

In the embodiment, the first surface 2315 is a first end surface 2312a (shown in FIG. 6) of the protruding portion 2312. In other embodiments, under the condition that the first inner surface 2313 (shown in FIG. 6) of the end cover 231 is not provided with the protruding portion 2312, the first surface 2315 may be the first inner surface 2313 of the end cover 231.

Figure 14:
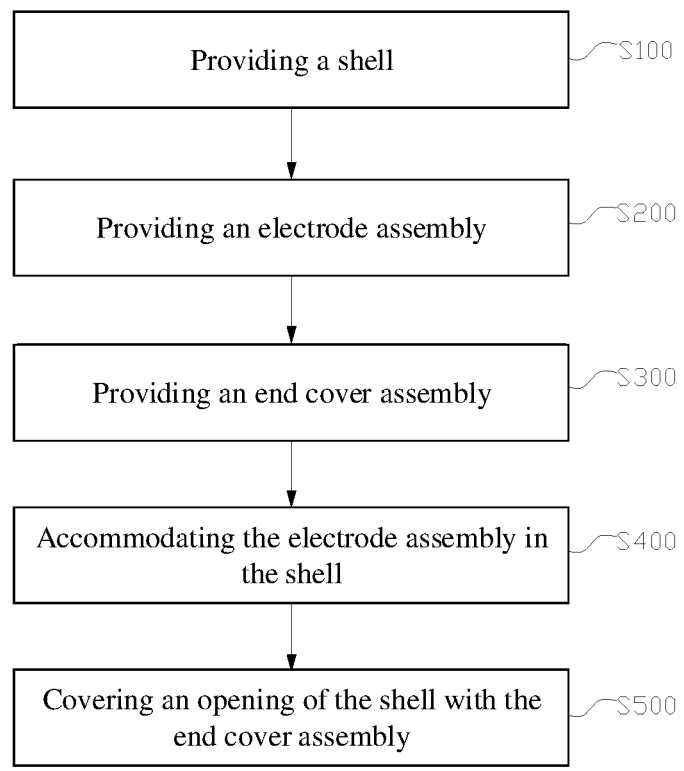
FIG. 14 is a flow diagram of a manufacturing method of a battery cell provided by some embodiments of the application.

Referring to FIG. 14, FIG. 14 is a flow diagram of a manufacturing method of a battery cell 20 provided by some embodiments of the application. The manufacturing method of a battery cell 20 includes:

S100, providing a shell 21, the shell 21 being provided with an opening;

S200, providing an electrode assembly 22, the electrode assembly 22 including a tab 221;

S300, providing an end cover assembly 23;

S400, accommodating the electrode assembly 22 in the shell 21; and

S500, covering the opening of the shell 21 with the end cover assembly 23.

Where the end cover assembly 23 includes an end cover 231, an insulating part 232, a blocking part 235 and a separating part 236. The end cover 231 is provided with an injection hole 2311, the injection hole 2311 penetrates through the end cover 231 in a thickness direction Z of the end cover 231, and the end cover 231 is configured to cover the opening of the shell 21. The insulating part 232 is configured to be arranged on a side of the end cover 231 in the thickness direction Z, the insulating part 232 is provided with a through hole 2321, and the through hole 2321 penetrates through the insulating part 232 in the thickness direction Z. The blocking part 235 is provided with a liquid outlet 2351, and the blocking part 235 is configured to change a flow direction of a fluid medium passing through the injection hole 2311 and the through hole 2321, and the fluid medium after changing the flow direction entering inside of the battery cell 20 through the liquid outlet 2351. The separating part 236 is configured to separate the tab 221 from the end cover 231 so as to prevent the tab 221 from penetrating through the through hole 2321 to be in contact with the end cover 231.

It should be noted that when the battery cell 20 is assembled based on the manufacturing method of the battery cell 20, the sequence of executing the S100, S200 and S300 is not limited herein, for example, the S300 may be executed first, then the S200 is executed then, and the S100 is then executed.

A related structure of the battery cell 20 manufactured by the manufacturing method of the battery cell 20 may refer to the battery cell 20 provided by the foregoing embodiments.

Figure 15:
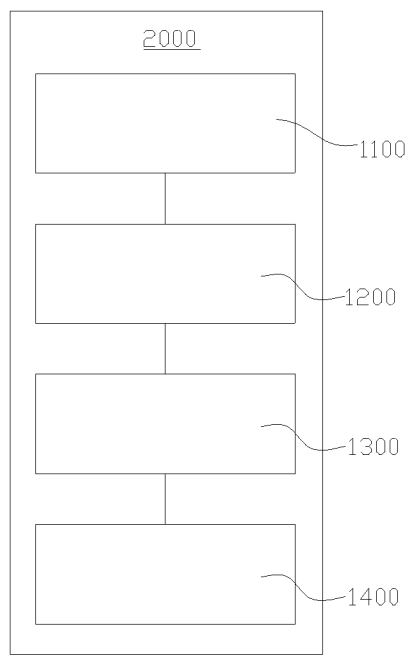
FIG. 15 is a schematic block diagram of a manufacturing device of a battery cell provided by some embodiments of the application.

Referring to FIG. 15, FIG. 15 is a schematic block diagram of the manufacturing device 2000 of the battery cell 20 provided by some embodiments of the application. The manufacturing device 2000 includes a first provision apparatus 1100, a second provision apparatus 1200, a third provision apparatus 1300 and an assembling apparatus 1400.

The first provision apparatus 1100 is configured to provide the shell 21, the shell 21 being provided with an opening. The second provision apparatus 1200 is configured to provide the electrode assembly 22, the electrode assembly 22 including the tab 221. The third provision apparatus 1300 is configured to provide the end cover assembly 23. The assembling apparatus 1400 is configured to accommodate the electrode assembly 22 in the shell 21 and cover the opening with the shell 21 with the end cover assembly 23.

The end cover assembly 23 includes the end cover 231, the insulating part 232, the blocking part 235 and the separating part 236. The end cover 231 is provided with an injection hole 2311, the injection hole 2311 penetrates through the end cover 231 in a thickness direction Z of the end cover 231, and the end cover 231 is configured to cover the opening of the shell 21. The insulating part 232 is configured to be arranged on a side of the end cover 231 in the thickness direction Z, the insulating part 232 is provided with a through hole 2321, and the through hole 2321 penetrates through the insulating part 232 in the thickness direction Z. The blocking part 235 is provided with a liquid outlet 2351, and the blocking part 235 is configured to change a flow direction of a fluid medium passing through the injection hole 2311 and the through hole 2321, and the fluid medium after changing the flow direction entering inside of the battery cell 20 through the liquid outlet 2351. The separating part 236 is configured to separate the tab 221 from the end cover 231 so as to prevent the tab 221 from penetrating through the through hole 2321 to be in contact with the end cover 231.

A related structure of the battery cell 20 manufactured by the manufacturing device 2000 of the battery cell 20 may refer to the battery cell 20 provided by foregoing the embodiments.

It should be noted that in the absence of conflict, the embodiments of the present disclosure and features in the embodiments can be combined with one another.

The above embodiments are merely used to describe the technical scheme of the application and are not used to limit the application. For those skilled in the art, various alternations and changes can be made on the application. Any modification, equivalent replacement, improvement, etc. made within the spirit and principle of the application shall be regarded as within the scope of the application.

What is claimed is:

1. A battery cell, comprising:
a shell, provided with an opening;
an electrode assembly, accommodated in the shell, the electrode assembly comprising a tab; and
an end cover assembly, wherein the end cover assembly comprises:
an end cover, provided with an injection hole, the injection hole penetrating through the end cover in a thickness direction of the end cover;
an insulating part, configured to be arranged on a side of the end cover in the thickness direction, the insulating part being provided with a through hole and the through hole penetrating through the insulating part in the thickness direction;
a blocking part, provided with a liquid outlet, the blocking part being configured to change a flow direction of a fluid medium passing through the injection hole and the through hole, and the fluid medium after changing the flow direction entering inside of the battery cell through the liquid outlet; and
a separating part, configured to separate the tab from the end cover so as to prevent the tab from penetrating through the through hole to be in contact with the end cover;
wherein at least one side of the blocking part in a first direction is provided with the separating part, the first direction being perpendicular to the thickness direction, wherein in the first direction and along a direction of the separating part departing from the blocking part, a part of a wall of the through hole exceeds the separating part.

2. The battery cell according to claim 1, wherein in the thickness direction, a projection of the separating part on the insulating part covers a part of the through hole.

3. The battery cell according to claim 1, wherein in the thickness direction, a projection of the blocking part on the insulating part covers a part of the through hole.

4. The battery cell according to claim 1, wherein in the thickness direction, the separating part is closer to the end cover than the liquid outlet.

5. The battery cell according to claim 1, wherein two sides of the blocking part in the first direction are both provided with the separating part.

6. The battery cell according to claim 1, wherein in the first direction, at least one side of the blocking part is provided with the liquid outlet, and the tab is configured to be arranged on one side of the blocking part and face the liquid outlet.

7. The battery cell according to claim 1, wherein the first direction is consistent with a width direction of the end cover.

8. The battery cell according to claim 1, wherein along the direction of the separating part departing from the blocking part, the through hole is provided with an exceeding portion that exceeds the separating part; and the battery cell further comprises a current collecting member, the current collecting number configured to connect the tab with an electrode terminal mounted on the end cover and a projection of the current collecting member in the thickness direction at least partially covering the exceeding portion.

9. The battery cell according to claim 1, wherein the blocking part comprises a first side surface, and the separating part and the liquid outlet both are arranged on the first side surface.

10. The battery cell according to claim 9, wherein the separating part comprises a second side surface opposite to the blocking part, and the second side surface is parallel to the first side surface.

11. The battery cell according to claim 1, wherein the blocking part is configured to be connected to the insulating part.

12. The battery cell according to claim 11, wherein the blocking part comprises a connecting portion and a resisting portion, the connecting portion is configured to connect the resisting portion with the insulating part, the resisting portion is arranged facing the through hole in the thickness direction, and the liquid outlet is arranged at the connecting portion.

13. The battery cell according to claim 1, wherein the end cover is provided with a protruding portion at a position corresponding to the injection hole, and the protruding portion is at least partially accommodated in the through hole.

14. The battery cell according to claim 13, wherein in the thickness direction, a projection of the protruding portion on the end cover is at least partially overlapped with a projection of the separating part on the end cover.

15. The battery cell according to claim 1, wherein the battery cell further comprises a current collecting member, the current collecting member is configured to connect the tab with an electrode terminal mounted on the end cover, the current collecting member comprises a connecting surface opposite to the end cover, and the connecting surface is configured to be connected to the tab; and in the thickness direction, the connecting surface is located farther away from the end cover compared with the separating part.

16. An end cover assembly for a battery cell, the battery cell comprising an electrode assembly provided with a tab, wherein the end cover assembly comprises:

an end cover, provided with an injection hole, the injection hole penetrating through the end cover in a thickness direction of the end cover and the end cover being configured to cover the opening;

an insulating part, configured to be arranged on a side of the end cover in the thickness direction, the insulating part being provided with a through hole and the through hole penetrating through the insulating part in the thickness direction;

a blocking part, provided with a liquid outlet, the blocking part being configured to change a flow direction of a fluid medium passing through the injection hole and the through hole, and the fluid medium after changing the flow direction entering inside of the battery cell through the liquid outlet; and a separating part, configured to separate the tab from the end cover so as to prevent the tab from penetrating through the through hole to be in contact with the end cover;

wherein at least one side of the blocking part in a first direction is provided with the separating part, the first direction being perpendicular to the thickness direction, wherein in the first direction and along a direction of the separating part departing from the blocking part, a part of a wall of the through hole exceeds the separating part.

17. A battery, comprising:

a box body; and a battery cell, the battery cell being accommodated in the box body and wherein the battery cell comprises:

a shell, provided with an opening;

an electrode assembly, accommodated in the shell, the electrode assembly comprising a tab; and an end cover assembly, wherein the end cover assembly comprises:

an end cover, provided with an injection hole, the injection hole penetrating through the end cover in a thickness direction of the end cover and the end cover being configured to cover the opening;

an insulating part, configured to be arranged on a side of the end cover in the thickness direction, the insulating part being provided with a through hole and the through hole penetrating through the insulating part in the thickness direction;

a blocking part, provided with a liquid outlet, the blocking part being configured to change a flow direction of a fluid medium passing through the injection hole and the through hole, and the fluid medium after changing the flow direction entering inside of the battery cell through the liquid outlet; and a separating part, configured to separate the tab from the end cover so as to prevent the tab from penetrating through the through hole to be in contact with the end cover;

wherein at least one side of the blocking part in a first direction is provided with the separating part, the first direction being perpendicular to the thickness direction, wherein in the first direction and along a direction of the separating part departing from the blocking part. a part of a wall of the through hole exceeds the separating part.

18. An electric device, comprising the battery cell according to claim 1.

* * * * *